United States Patent [19]

Neuer et al.

[11] 3,869,799

[45] Mar. 11, 1975

[54] UNIVERSAL MULTI-COORDINATE SENSOR

[75] Inventors: Harald Neuer, Wasseralfingen; Franz Szenger, Konigsbronn; Klaus Herzog, Heidenheim; Joachim Neumann, Oberkochen, all of Germany

[73] Assignee: Carl Zeiss-Stiftung, Wuerttemberg, Germany

[22] Filed: Aug. 27, 1973

[21] Appl. No.: 391,819

[30] Foreign Application Priority Data

Aug. 29, 1972 Germany.............................. 2242355

[52] U.S. Cl. .............. 33/174 L, 33/169 R, 33/23 K
[51] Int. Cl. .............................................. G01b 7/28
[58] Field of Search......... 33/174 P, 174 PC, 174 L, 33/169 R, 172 E, 23 K; 90/62

[56] References Cited
UNITED STATES PATENTS

| | | |
|---|---|---|
| 3,149,421 | 9/1964 | O'Brien............................ 33/172 E |
| 3,164,909 | 1/1965 | Rosenberg......................... 33/174 L |
| 3,572,724 | 3/1971 | Rabinow........................... 274/13 R |
| 3,798,779 | 3/1974 | Gluck............................... 33/174 L |

OTHER PUBLICATIONS

IBM Tech. Disc. Bulletin, Hole Sensing Device, R. M. Gustafson, Vol. 3, No. 11, 4/61.

Primary Examiner—Harry N. Haroian
Attorney, Agent, or Firm—Nichol M. Sandoe

[57] ABSTRACT

The invention contemplates a multiple-coordinate instrumental probe for friction-free and play-free tracking response to or measurement contact with a multidimensional profile, as for example a workpiece to be gaged for adherence within specified tolerance for a particular dimension quantity. As shown and described, the instrument responds in three coordinates and is equally applicable to the tracking or contacting of convex and concave formations.

13 Claims, 6 Drawing Figures

UNIVERSAL MULTI-COORDINATE SENSOR

This invention relates to an electronic multi-coordinate sensor comprising a sensing head adapted to simultaneously carry one or several sensing pins, for sensing multi-dimensional objects, as for use on coordinate-measuring machines.

In making dimensional measurements at given measuring points or on curved surfaces of mechanical bodies, generally randomly located in space, the attainable measuring accuracy is critically dependent upon the type of sensing used. This invention relates to an arrangement which, in a universal manner, permits a more objective sending of randomly shaped workpieces in a range of accuracy of 1 μm and better, while avoiding the hitherto generally uncontrollable possibilities of error occasioned by the subjective adjustments of a measuring operator.

The prior art includes devices for contact-sensing of bodies in two or several directions, in which devices the sensing direction of a sensing pin can be reoriented into another direction, using hinged or guided support means, such as spring hinges, air bearings or the like. Such devices have been devised such that a single probe can be used for sensing in one direction and, after change-over, also in an other direction.

Such sensing arrangements suffer from mechanical hysteresis and from the further shortcoming that when changing over the sensing arrangement, the coordinate zero point of the sensing system generally gets lost and must be adjusted anew via auxiliary reference points. Moreover, in such sensing arrangements, it is not possible to sense in an oblique direction, nor is it possible to develop simultaneous signal outputs in two or more orthogonally related reference directions.

The prior art also includes devices in which two electric signal transmitters are used to sense the coordinate points of a body in coordinate directions defined by two signal directions, without change-over or hinging.

The prior art devices suffer further from the limitation that they can only sense the object being measured from individual, outwardly disposed side surfaces and therefore, can only carry out linear measurements on a pre-determined side surface of the object. Thus, such devices are inadequate in application to multi-dimensional bodies which in most cases also have concealed or enclosed measuring surfaces, grooves, slots, hollow corners, or obliquely disposed bores, wherein it is desired to be able, for one chucked position of the workpiece, to sense all side surfaces with the exception of the chucked or clamping surface.

In one prior device which includes two signal transmitters, a conical or cylindrical measuring probe is forcedly pressed into a bore in order to identify the center of the bore. This method only functions if the axis of the probe is parallel to the axis of the bore, but in most cases, this cannot be presupposed. Moreover, in the case of foreign matter or burrs at the bore inlet, which often cannot be avoided in practice, further error is developed, by offsetting displacement of the measuring probe relative to the effective bore axis. Also, in this device there is no assurance of torsional stiffness of the mechanical mounting of the measuring probe, in that the measuring probe can so-to-speak float freely in one plane; such action is, of course, not suitable when sensing oblique surfaces, since the measuring probe would deflect unpredictably in different directions, due to lack of directional stability.

Another prior device uses a guide for measurement in one direction, while employing a shift lever in the other direction. Since the lever has a specific radius, the conversion of the linear movement into an angular movement for the purpose of linear measurement can only be effected at a specific distance of the sensing pin point from the bending hinge. When using another sensing pin of, for instance, different lever length, the arrangement must be re-calibrated to the new sensing pin.

It is the object of this invention to provide a device which makes it possible to sense all side or bounding surfaces and also surfaces, grooves or hollow corners of a workpiece, which are obliquely arranged in space, without rechucking the workpiece or the sensing head, and also without requiring repeated re-calibration of the sensing head.

According to the invention, this object is attained by providing a sensing head with a torsionally stiff series of play-free and friction-free compliant connections which together form a defined-plane or spatial-coordinate system, using electric signal transmitters sensitive to direction and position, such as inductive, capacitive or photoelectronic means which also constitute a torsionally stiff coordinate system. In addition, finely adjustable precision locking mechanisms are provided for adjustment of the correspondence of the position of the coordinate zero points of the compliant systems with the zero point position of the signal transmitters, and means for applying a predetermined measuring-force loading of the probe on the workpiece in any of the directions of compliant deflection or deflectability.

The sensing head of the invention offers the advantages that (a) the measurement is independent of length or orientation of the sensing pin, (b) the torsionally stiff series arrangement makes it possible to sense an obliquely oriented bounding surface in a preferred direction, without having the sensing head deflect unpredictably by reaction to contact with the oblique surface or with a curvature of the workpiece, (c) by using several electric signal transmitters which respond on mutually perpendicular axes in space, a so-called "electric" zero point of the sensing head is generated; and (d) by using the signals of the signal transmitters, a position control of the mechanical-geometric zero point is realizable for each component of the compliant connection system.

For the case of surfaces located obliquely in space, the arrangement according to the invention also permits change-over of the direction of sensing towards an object at a direction normal thereto, should the inclination of the oblique surface be so great for the one direction as to develop excessive lateral force on the sensing head. In the case of grooves or hollow corners, simultaneous sensing is possible in two, or even three directions, it being possible to place the resultant of the measuring forces in the axis of symmetry of the sensed profile.

Illustrative features of an embodiment of the invention will be described more fully, in reference to the accompanying drawings, in which.

Figure 1:
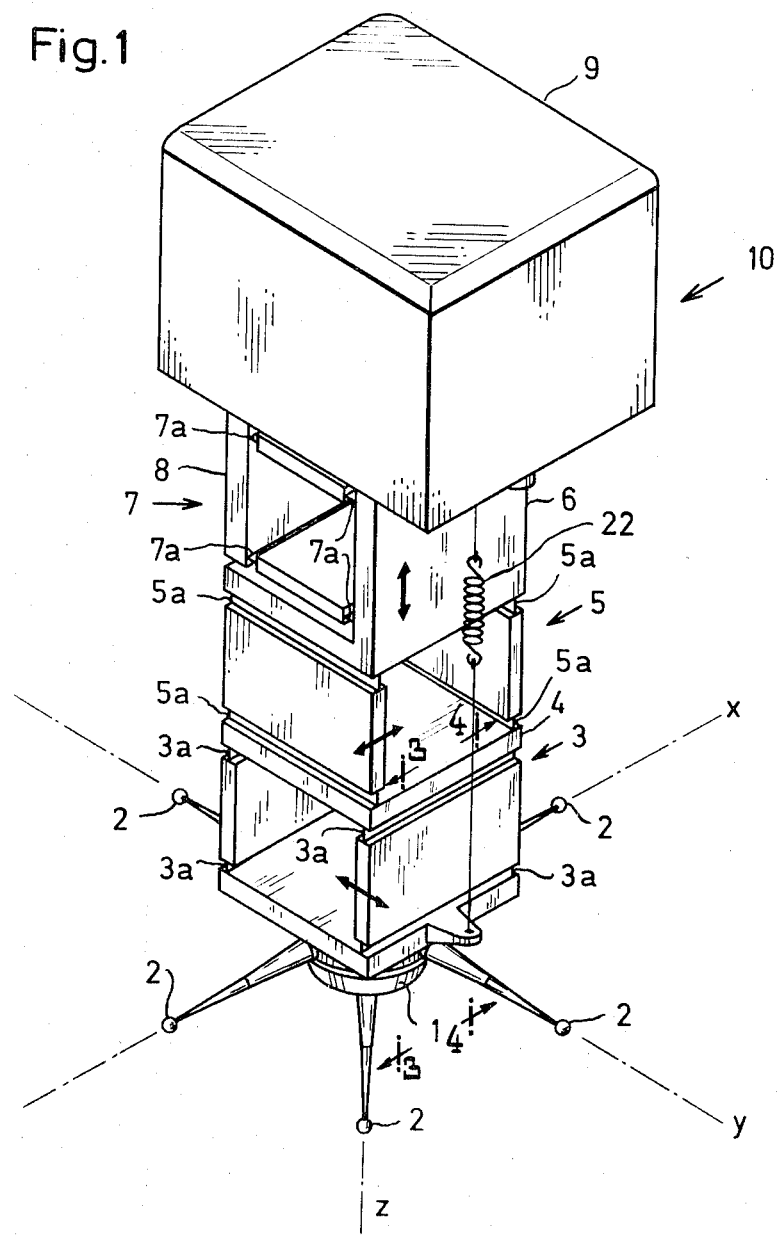
FIG. 1 is a simplified isometric view of principal components of a sensing device or probe means of the invention.
Figure 2:
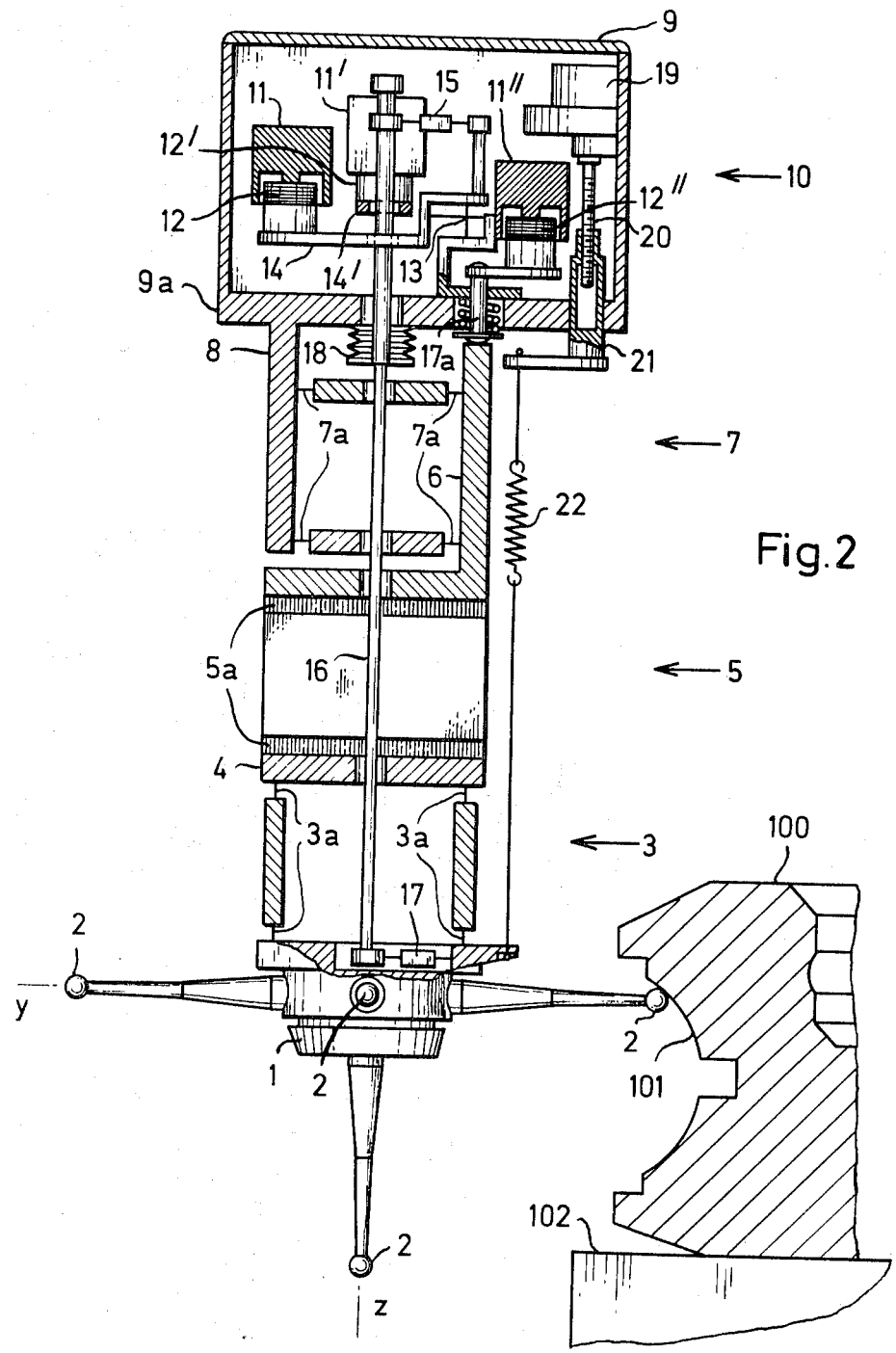
FIG. 2 is a view in elevation of the device of FIG. 1, partly broken away and in longitudinal section, and shown in conjunction with a workpiece.
Figure 4:
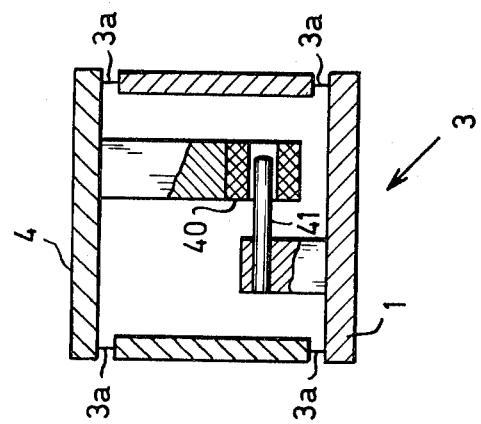
Figure 5:
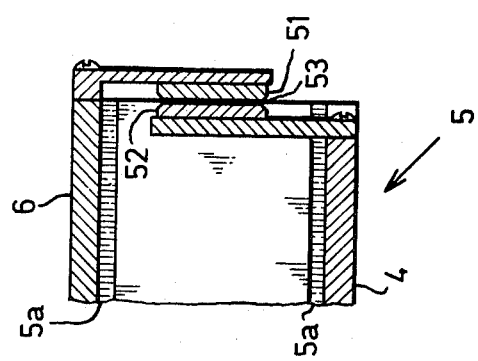
Figure 3:
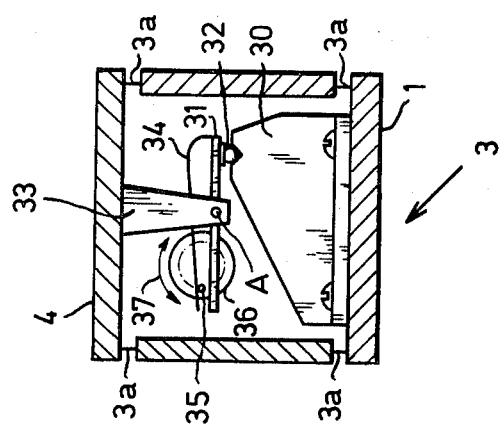
Figure 6:
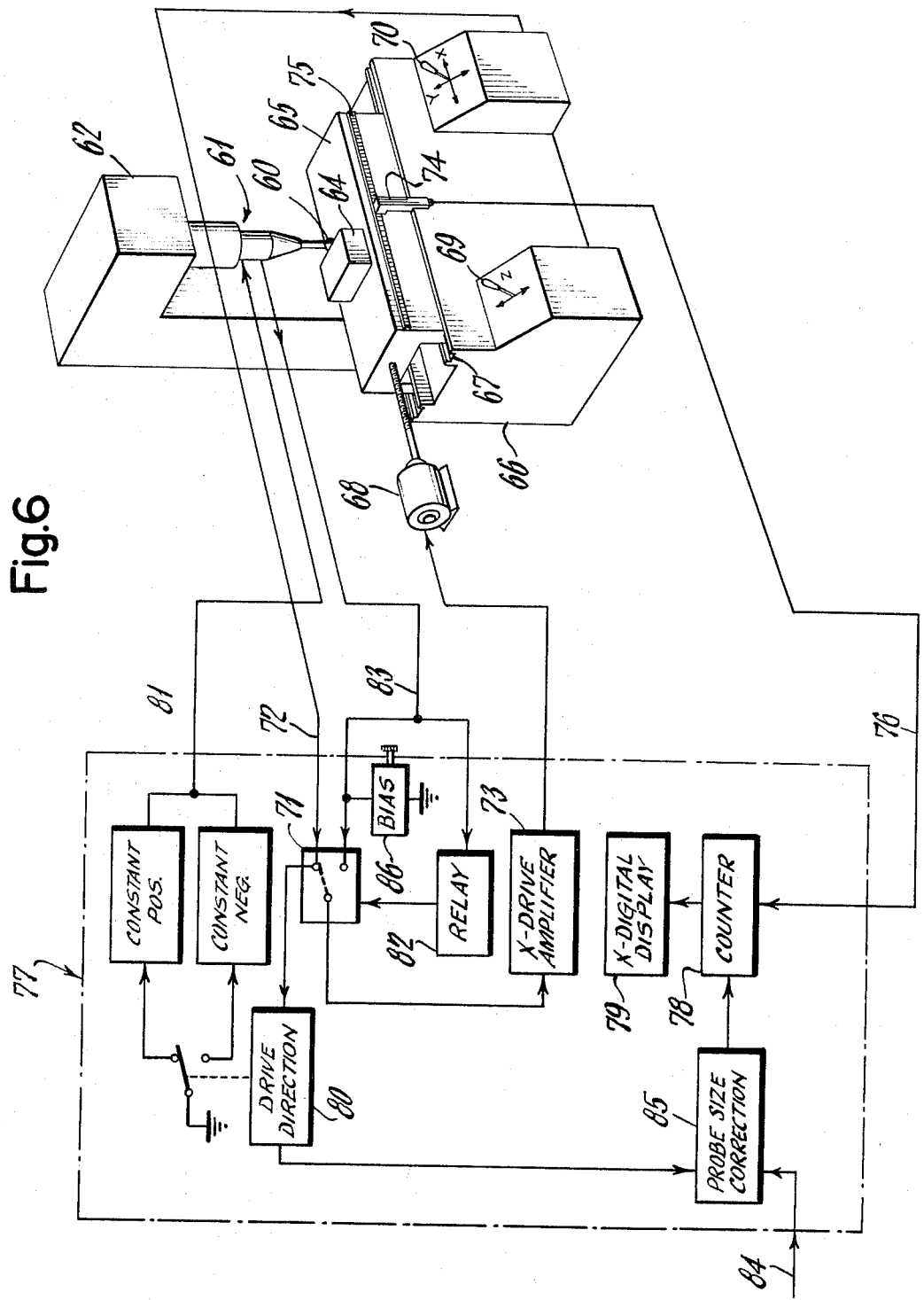

FIGS. 3, 4, and 5 are simplified diagrams of details of probe-suspension and displacement-responsive mechanism, applicable to components of the embodiment of FIGS. 1 and 2; and FIG. 6 is a simplified diagram of a measuring instrument in which the probe means is usable, illustrative control treatment being illustrated only for one of the three available components of motion and probe response.

FIG. 1 is useful to show principal elements of the torsionally stiff-suspension of a sensing head, using, for example, play-free and friction-free component arrangements each having a single degree of directional freedom; specifically, spring parallelograms are used, with lateral lengths dimensioned to effectively obtain a kinematically straight guide.

The sensing-pin hub or holder 1 is shown equipped with a series of five radially arranged interchangeable sensing pins 2, two for probing opposite directions along the X-axis, two for opposed directions along the Y-axis, and one along the Z-axis. Holder 1 is compliantly connected to a plate 4 via a spring parallelogram 3 having four leaf springs 3a. In similar fashion, plate 4 is compliantly connected to a bracket 6 via another spring parallelogram 5 having leaf springs 5a which are offset by 90° from the leaf springs 3a. Finally, bracket 6 is compliantly suspended, via a third spring parallelogram 7 including horizontally disposed leaf springs 7a, from a connecting member 8 having rigid connection to an upper part 9, it being understood that part 9 is effectively a frame reference, even though in certain instrument applications it may be subject to known transposition displacements in the course of probe manipulation.

The described suspension system will be seen as a torsionally stiff series of three interconnected play-free and friction-free single-axis "guide" systems for the respective axes of the mechanical coordinate system X-Y-Z. Thus, for example, bracket 6 is movable parallel to the Z-direction, while plate 4 is movable parallel to the Z- and X-directions, and while the sensing-pin holder 1 is movable parallel to the X, Y, and Z directions.

FIG. 2 shows an illustrative application of the device of FIG. 1, having dimension-sensing contact with a curved surface 101 of a workpiece 100. The latter, may, for example, be clamped at its lower surface to the table 102 of the coordinate-measuring machine or instrument already referred to. From the illustrated proportions, it can be recognized that other hardly accessible measuring surfaces of the workpiece can also be sensed by the device of FIG. 1 and 2, all without need to rechuck the workpiece or the sensing arrangement.

FIG. 2 also serves to illustrate the means for application of a predetermined measuring (probe-contact) force, as well as a gravity balance in the Z-direction, to compensate for weight of the compliant suspension system including sensing pins and sensing-pin accommodation.

The upper part of the sensing head 10 is shown to house three moving-coil systems, for independent generation of probe-contact force in the respective component-axis directions. In these systems, annular-gap magnets 11-11'-11" are fixedly mounted to part 9, and each of these gaps is accessible to a moving coil 12-12'-12" mounted for movement into and out of its associated gap, with respect to a zero or mid-position, depending upon the polarity and strength of current supplied to each coil. Current to each individual moving coil can be selectively switched on or off, or it may be controlled electronically, to generate predetermined force-loading of probe contact on the workpiece.

In the case of moving coil 12, which in the form shown serves for probe-contact loading in the Y-axis direction, a lever 14 carries coil 12 and is pivotable about a horizontal axis 13 which is normal to the Y-direction; pivot axis 13 is shown established by crossed leaf springs having fixed reference to the base 9a of part 9 via suitable bracket means. Movements of the other end of lever 14 are transferred to the sensing-pin holder 1 by way of elastically interconnected transfer elements 15-16-17, wherein element 16 is a vertical rod having universal pivot action via central connection to the bottom of a flexible corrugated cup or bellows member 18 secured to the base 9a. Thus, in the sense of FIG. 2, a downward or repulsion force reaction at 11-12 develops a counterclockwise displacement of lever 14 about axis 13, causing link 15 to drive rod 16 counter-clockwise about its center at 18; at its lower end, rod 16 (via link 17) drives holder 1 (and its work-contact pins 2) to the right, against the work surface 101, with a force predetermined by the magnitude of coil excitation and by the relation of moment arms in the described mechanical connections.

By a similar lever and link system which for purposes of clarity is not shown here more than to designate lever 14' for coil 12', the moving-coil system 11'-12' will be understood to pivot about a horizontal axis normal to axis 13 and in the same plane, with upper-link connection to rod 16 in the same horizontal plane as connection 15, and with lower-link connection to holder 1 in the same horizontal plane as connection 17; thus, all motions (forces) generated by magnet-coil reaction at 11'-12' are in the vertical plane normal to the vertical plane of motions (forces) generated by magnet-coil reaction at 11-12, so that X and Y-axis components at holder 1 are independently accommodated at 11'-12' and 11-12, respectively.

Finally, the Z-component of the system is served by moving-coil means 11"-12" via a vertically guided transfer element 17a, lightly biased in its contact with the vertically movable bracket 6. Gravitational bias on the described suspended parts is, in the form shown, compensated by a lead screw 20, motor-driven at 19 and having loaded connection 22, via a vertically guided lead nut 21, to the holder 1. This arrangement for automatic weight balance, i.e., adjustment control of the motor 19, may be effected automatically (by means not shown) as part of the calibration of the probe head, for a given set of installed holder 1 and pins 2.

Each of the spring parallelograms 3-5-7 illustrated for the sensing head of FIGS. 1 and 2 also includes further additional structural and detection arrangements illustrated in FIGS. 3 to 5, the same being suitably mounted to the individual parallelograms. In FIGS. 3 to 5, these additional arrangements are only shown for a selected one of the parallelograms, since they may be completely identical in their use with each of the other parallelograms.

By way of example, the spring parallelogram 3 of FIGS. 1 and 2 is selected for the showing of FIG. 3. In FIG. 3, locking mechanism acts in restraint of displacement in the "guiding" direction of the parallelogram.

The holder part 1, movable parallel to the plate part 4, carries a detent body 30 having a V-shaped detent groove engageable with a drop-in ball 32 provided at one end of a lever 31, pitvoted at A to a trunion 33 forming part of plate 4. There is thus established a positively locked relation for the central relative position between parts 4 and 1 of the spring parallelogram 3. Similar detent mechanism in parallelograms 5–7, for each of their respective coordinate degrees of freedom, provides the same precision locking against motion, thereby completing the provision for establishing a fixed mechanical geometrical zero point for the sensing head 10.

As will now be pointed out, each detent lock for one of the component "guide" systems has additional provision for adjustably varying the loaded extend of detent action. A leaf spring 34 is secured to the front end of lever 31; it extends rearwardly, being engaged at its rear end by a crank pin 35, shown carried by a crank plate 36. A reversible electric motor (carried by plate 4) rotates plate 36 and is suggested by a double-direction arrow 37. From the position shown for pin 35, a counterclockwise rotation of plate 36 raises ball 32 to disengage the detent, thereby freeing the parallelogram, while a clockwise rotation increases resilient loading of the detent action.

FIG. 4 is another view of the same spring parallelogram 3 to show error-signal generating parts which may be additional to and offset from those of FIG. 3; again, the parts of FIG. 4 are representative of what is also provided at the other two parallelograms 5–7. In FIG. 4, a direction-sensitive and position-sensitive transducer comprises coil means 40 rigidly connected to plate 4 and a coacting core element 41 rigidly connected to holder 1. The transducer coil is so devised that, for one relative position of parts 4 and 1, no output signal is generated, thus establishing an "electric zero" or null point in the "guided" direction of parallelogram 3. In the same manner, spring parallelograms 5–7 have electric zero points, and all three "electric" zero points define the "electric" zero point of the total sensing head. In order to calibrate the system for exact coincidence of mechanical-zero and electrical-zero points, the motor 36 is driven to establish mechanical-zero clamping at 30–31–32; external bias may then be applied as necessary to the circuit of coil 40 (by means not shown) until zero output signal is produced, thus setting the electrical-zero point to the mechanical-zero relative position of plates 1–4. Such bias is schematically suggested at 86 in FIG. 6, to be later described.

FIG. 5 shows, for the selected spring parallelogram 5, a viscohydraulic damping of movement in which a viscous liquid is filled into the capillary gap 53 formed by the plates 51 and 52. The plate 51 is fixedly connected with the part 6, and the plate 52 is fixedly connected with the part 4. Capillary action prevents flow-out of liquid, and no seal (subject to friction) is required.

FIG. 6 is a simplified showing of a measuring instrument to which probe means of the invention has been applied. For simplicity, only one tip 60 for the sensor unit 61 is shown, it being understood that the frame-mounted parts 8–9 thereof are fixedly secured to and suspended from the overhanging arm 62 of a massive frame upright 63. A workpiece 64 to be measured is suitably chucked to work-holding means 65 which may be carried by multi-component slide connection to the base 66 of the machine frame; for simplicity in FIG. 6, the showing is, however, limited only to consideration of the X-axis context, so that holder 65 appears as a horizontal table, slidable in X-axis guide means 67 and subject to the positioning control of motor and lead-screw means 68. The two other components of work-holder positioning of the workpiece 64 are merely suggested at separate "joy-sticks" 69–70, convenient to the operator, at the front of the instrument; control 69 is shown with an opposed-arrow symbol to designate selective reversible work-positioning drive in the Z-axis direction, while control 70 is universally manipulable to serve the X-axis and Y-axis components of desired work-positioning drive, with selective reversability. For the X-axis component here selected for more detailed showing, switch contacts at 71 have an upper position in which control 70 is operative, via line 72 and X-axis amplifier means 73 to drive motor 68; generally, such drive will be relatively fast, to bring the probe 60 to the work 64. During the course of such movement, the actual displacement with respect to a preset "zero" reference on the X-axis may be monitored by photoelectric scanning means 74, positioned to scan the division lines of a scale 75 carried by slide 65, and the pulses thereby developed in an output line 76 are supplied to a computer and control console 77; as shown, the computer includes an X-axis digital counter 78 and display means 79.

To complete the description of parts, suitable means 80 is responsive to the direction of positioning-drive via line 72, means 80 having a relay-operating output which determines whether constant-positive current or constant-negative current will be supplied in line 81 to the X-axis force-loading coil means 11'–12' of unit 61. Thus, for the right-to-left probe approach to work 64 shown in FIG. 6, means 80 will have selected the correct polarity of excitation of coil means 11'–12' to assure a constant, predetermined (and preferably relatively low level of) preload force to be applied in contacting the work. Finally, means such as a relay 82 responsive to the sudden change of output of coil 40 (upon probe-to-work contact) is operative to shift switch contacts 71, so that work-positioning displacements (in the X-axis direction) are thereafter governed by the output signal of the X-axis coil 40, supplied in line 83.

In operation, assuming initial joy-stick operation at 70 to bring the probe 60 to the workpiece 64, work contact immediately transfers positioning control from means 70 to means 40. The constant bias signal (of correct polarity) in line 81 will assure steady contact with the workpiece while the "error-signal" output of coil 40 is operative to correctly position table (slide) 65 to the electrical-zero point. Since this electrical-zero point was precalibrated to the mechanical-zero point, one is assured that all X-axis positioning displacements come to a halt at an objectively determined position, free of hysteresis effects; at this point, counter means 78 will provide the correct index of the probed point on the work-piece, it being understood that suitable correction for radius of the probe contact tip and for radial length of the probe pin can be achieved automatically, as previously set input corrections to the computer, the same being schematically suggested by arrow 84.

Alternatively, it will be understood that position-and direction-indicating signals originating from transducer means 40 can also be used for the measurement of deviation of the workpiece point being examined from a preset position. Also, signals of transducer means 40 can be used for positioning one or several coordinate slides (not shown) for the mounted placement of sensor head 10, thus determining a zero position of the sensor. Still further, during zero passage, transducer means 40 can supply a holding or storing command to a displacement-measuring arrangement or to a pulse-counting arrangement, in order to achieve a dynamic measurement during displacement of the workpiece without positioning of the zero point.

As indicated, the sensing directions of the sensing pins are available at the computer and control console 77. Such information is directly available to that part 85 of the computer which is relied upon to correct for the size and offset length of the sensing pin, relative to the holding means 1. By this arrangement, during each sensing action, the effective ball radius of the sensing pin tip is added correctly as to sign, and the workpiece contacted points can be calculated directly, without requiring subjective decisions by the measuring operator.

The transducer or signal transmitter 40 has the additional feature that its signals can be a reference for the control of locking to the desired electric zero point.

This invention is not restricted to the illustrated embodiment. For example, other straight guide systems such as plane or spatial cross-slide systems and other electric signal transmitters, for instance, capacitative, ohmic or optical-electronic measuring systems can be used.

Furthermore, the application is not restricted alone to coordinate measuring machines. The invention can also be used in different measuring and processing devices or machine tools.

What is claimed is:

1. Multi-coordinate sensor means, comprising a mountable frame, a first torsionally rigid spring parallelogram suspension having a single degree of freedom and having one side fixedly mounted to said frame whereby the opposite side is movable with respect to said one side in essentially only the direction of said single degree of freedom, a second torsionally rigid spring parallelogram suspension having a single degree of freedom and having one side fixedly mounted to said opposite side of said first parallelogram suspension, said second degree of freedom being in a direction generally transverse to that of said first degree of freedom, whereby the opposite side of said second parallelogram suspension is movable with respect to said one side of said first parallelogram suspension in essentially only the directions of said first and second degrees of freedom, work-contacting probe-supporting means torsionally rigidly carried by said opposite side of said second parallelogram suspension, and first and second torsionally rigid force-transfer mechanisms connected to said frame and respectively and independently to the first and to the second of said opposite sides and including separate electrical force-developing transducers producing force only in said first and second directions, respectively, and a work-contacting probe element carried by said probe-supporting means.

2. Multi-coordinate sensor means according to claim 1, wherein said first and second directions are perpendicular.

3. Multi-coordinate sensor means according to claim 1, in which said work-contacting probe-supporting means includes a third torsionally rigid spring parallelogram suspension having a single degree of freedom and having one side fixedly related to the opposite side of said second parallelogram, said third degree of freedom being in a direction generally transverse to the respective directions of said first and second degrees of freedom, said work-contacting probe element being carried by the opposite side of said third parallelogram.

4. Multi-coordinate sensor means according to claim 3, in which said degrees of freedom are mutually perpendicular.

5. Multi-coordinate sensor means according to claim 4, in which said parallelograms are connected in a torsionally rigid array along a direction common to a single one of said degrees of freedom.

6. Multi-coordinate sensor means according to claim 1, in which each parallelogram suspension includes means electrically responsive to the magnitude of displacement of said opposite sides thereof.

7. Multi-coordinate sensor means according to claim 6, in which each parallelogram suspension includes a releasable mechanical-zero locating mechanism, and adjustable circuit means associated with said electrically responsive means for establishing an electrical-zero setting thereof when in the locked mechanical-zero position.

8. A multi-coordinate measuring machine, including a frame, work-holding means, work-contacting sensor-holding means, guide and reversible drive means for the relative placement of said work-holding and sensor-holding means; sensor means comprising a torsionally rigid spring parallelogram suspension having a single degree of freedom, one side of said parallelogram suspension being mounted to said sensor-holding means, a work-contacting probe carried by the opposite side of said parallelogram suspension, and said degree of freedom being alinged in accordacne with the direction of said guide means; control means for said reversible drive including sensing-transducer means carried by said parallelogram suspension and electrically responsive to a displacement of said opposite sides, said control means being operative to effectively disconnect said drive upon onset of a displacement-detecting signal by said transducer, and said sensing-transducer means producing an electrical output signal reflecting the magnitude and direction of deflection of the said opposite sides of said suspension; and a torsionally rigid force-transfer mechanism independently connected between said one side and said opposite side and including an electrical force-developing transducer producing force only in the direction of movement of said opposite sides, the polarity of excitation of such transducer being in the work-contacting direction, said control means being further operative to connect said force-developing transducer for force development upon said drive disconnection.

9. A machine according to claim 8, in which said parallelogram suspension includes a releasable mechanical-zero locating mechanism, and adjustable circuit means associated with said electrically responsive means for establishing an electrical-zero setting thereof when in the locked mechanical-zero position.

10. Multi-coordinate sensor means, comprising a mountable frame, a work-contact probe, and a torsionally stiff series of three interconnected play-free and friction-free single-axis guide systems, said series of systems interconnecting said frame and probe; each one of said guide systems having a single straight-line directional orientation which is orthogonally related to the other two guide systems, and each one of said systems including electric-transducer means producing an electric-signal output in accordance with a displacement in the axis direction of said one system; and torsionally rigid force-applying means mounted to said frame and having independent force-applying connection to a selected one of said guide systems in the single-axis direction that is unique to said selected one guide system, said force-applying means including electrically operable means for assuring a predetermined magnitude of force application to said selected one guide system and in a predetermined sense in the single-axis direction that is unique to said selected one guide system.

11. The sensor means of claim 10, in which said force-applying means is one of three independent force-applying means, each of which includes its own electrically operable means for force application and each of which is connected to a different one of the three guide systems and in the force-applying direction unique to directional orientation of the guide system to which it is connected.

12. The sensor means of claim 11, in which each of said guide systems includes a releasable mechanical-zero locating mechanism, and adjustable circuit means associated with the output of each of the respective transducers for establishing an electrical-zero setting thereof when in mechanical-zero position.

13. The machine of claim 8, including displacement-measuring means responsive to displacement of said work-holding and sensor-holding means, and in which said probe has a first work-contacting region for work-contact in a first direction of approach to a workpiece and a second work-contacting region for work contact in a second direction of approach to a workpiece, said regions of said probe being in fixed physically spaced relation to each other, and measurement-correction means connected to said measuring means and responsive to the direction of approach to work contact for correcting the displacement measurement to compensate for the physical spacing of said regions.

\* \* \* \* \*